(12) United States Patent
Laaninen et al.

(10) Patent No.: US 10,605,531 B2
(45) Date of Patent: Mar. 31, 2020

(54) METHOD AND ARRANGEMENT FOR FEEDING FEED MATERIAL FROM A BIN FOR FEED MATERIAL INTO A FURNACE SPACE OF A SMELTING FURNACE

(71) Applicant: OUTOTEC (FINLAND) OY, Espoo (FI)

(72) Inventors: Aki Laaninen, Espoo (FI); Elli Miettinen, Espoo (FI); Peter Björklund, Espoo (FI)

(73) Assignee: Outotec (Finland) Oy, Espoo (FI)

( * ) Notice: Subject to any disclaimer, the term of this patent is extended or adjusted under 35 U.S.C. 154(b) by 191 days.

(21) Appl. No.: 14/782,569

(22) PCT Filed: Apr. 7, 2014

(86) PCT No.: PCT/FI2014/050241
§ 371 (c)(1),
(2) Date: Oct. 5, 2015

(87) PCT Pub. No.: WO2014/167176
PCT Pub. Date: Oct. 16, 2014

(65) Prior Publication Data
US 2016/0040935 A1  Feb. 11, 2016

(30) Foreign Application Priority Data
Apr. 8, 2013 (FI) ...................................... 20135334

(51) Int. Cl.
*F27D 3/00* (2006.01)
*F27D 3/08* (2006.01)
(Continued)

(52) U.S. Cl.
CPC .............. *F27D 3/0033* (2013.01); *F27B 1/20* (2013.01); *F27D 3/08* (2013.01); *F27D 3/10* (2013.01);
(Continued)

(58) Field of Classification Search
CPC ............. F27D 19/00; F27D 2003/0075; F27D 3/0033; F27D 3/08; F27D 3/10; F27D 3/18; G01F 1/704; G01F 1/74; F27B 1/20
(Continued)

(56) References Cited

U.S. PATENT DOCUMENTS 3,636,763 A * 1/1972 Beck ....................... G01F 1/666
324/71.4
6,565,799 B1 * 5/2003 Kojo ................... C22B 15/0047
266/182
(Continued)

FOREIGN PATENT DOCUMENTS

CA    1056603 A1   6/1979
CN    1353771 A    6/2002
(Continued)

OTHER PUBLICATIONS

Extended European Search Report prepared by the European Patent Office for EP 14782335, dated Oct. 12, 2016, 4 pages.
(Continued)

*Primary Examiner* — Jessee R Roe
*Assistant Examiner* — Michael Aboagye
(74) *Attorney, Agent, or Firm* — Chernoff Vilhauer LLP

(57) ABSTRACT

The invention relates to a method and to an arrangement for feeding feed material from a bin (10) for feed material into a furnace space of a smelting furnace. The method comprises a first providing step for providing a feed material feeding arrangement (9) for feeding feed material from the bin (10) for feed material into the furnace space of the smelting furnace (1), and a feeding step for feeding feed material from the bin (10) for feed material into the furnace space of the smelting furnace. The method comprises additionally a second providing step for providing at least one sensor (11) for measuring flow of feed material at a position
(Continued)

between the bin (10) for feed material and the furnace space of the smelting furnace (1), and a measuring step for measuring flow of feed material by means of said at least one sensor (11) at said position.

3 Claims, 11 Drawing Sheets

(51) Int. Cl.

| | |
|---|---|
| *F27D 3/18* | (2006.01) |
| *G01F 1/704* | (2006.01) |
| *F27D 19/00* | (2006.01) |
| *F27D 3/10* | (2006.01) |
| *F27B 1/20* | (2006.01) |
| *G01F 1/74* | (2006.01) |

(52) U.S. Cl.
CPC .............. *F27D 3/18* (2013.01); *F27D 19/00* (2013.01); *G01F 1/704* (2013.01); *G01F 1/74* (2013.01); *F27D 2003/0075* (2013.01)

(58) Field of Classification Search
USPC .... 266/44, 216, 197, 265, 266, 267; 75/386, 75/639, 649, 641, 643, 638; 414/21, 171, 414/175, 197
See application file for complete search history.

(56) References Cited

U.S. PATENT DOCUMENTS

| | | | | |
|---|---|---|---|---|
| 8,461,852 B2 * | 6/2013 | Yang | ...................... | G01N 27/22 |
| | | | | 324/464 |
| 8,889,061 B2 * | 11/2014 | Sipila | ...................... | F27D 3/18 |
| | | | | 266/266 |
| 2007/0000416 A1 * | 1/2007 | Widmer | .................... | F23K 3/00 |
| | | | | 110/342 |
| 2010/0006012 A1 | 1/2010 | Matsumoto et al. | | |
| 2010/0332170 A1 | 12/2010 | Gao et al. | | |
| 2011/0197831 A1 * | 8/2011 | Ohyatsu | .................. | F22B 35/00 |
| | | | | 122/6 R |
| 2012/0248664 A1 * | 10/2012 | Sipila | ...................... | F27D 3/18 |
| | | | | 266/171 |
| 2012/0280439 A1 | 11/2012 | Gonzalez et al. | | |
| 2013/0049770 A1 | 2/2013 | Basu et al. | | |

FOREIGN PATENT DOCUMENTS

| | | |
|---|---|---|
| CN | 101031522 A | 9/2007 |
| CN | 101663537 A | 3/2010 |
| GB | 2312292 A | 10/1997 |
| JP | S59049421 A | 3/1984 |
| JP | 2003013152 A | 1/2003 |
| JP | 2008038175 A | 2/2008 |
| KR | 20100035808 A | 4/2010 |
| KR | 2012-0104571 A | 9/2012 |
| WO | 2008/087245 A1 | 7/2008 |
| WO | 2011070239 A1 | 6/2011 |
| WO | 2014044910 A1 | 3/2014 |

OTHER PUBLICATIONS

PCT, International Search Report for International Patent Application No. PCT/FI2014/050241, dated Aug. 25, 2014, pp. 5.

Notice of Grounds of Rejection prepared by the Korean Intellectual Property for KR 2015-7030328, dated Dec. 13, 2016, 14 pages.

Notification of the First Office Action prepared by the State Intellectual Property Office of the People's Republic of China for CN 201480022599.7, dated Mar. 5, 2018, 21 pages.

Notification of the Third Office Action prepared by the State Intellectual Property Office of the People's Republic of China for CN 201480022599.7, dated Jun. 5, 2019, 25 pages.

\* cited by examiner (A-A FIG 10):

METHOD AND ARRANGEMENT FOR FEEDING FEED MATERIAL FROM A BIN FOR FEED MATERIAL INTO A FURNACE SPACE OF A SMELTING FURNACE

CROSS-REFERENCE TO RELATED APPLICATIONS

This is a national stage application filed under 35 USC 371 based on International Application No. PCT/FI2014/050241 filed Apr. 7, 2014 and claims priority under 35 USC 119 of Finnish Patent Application No. 20135334 filed Apr. 8, 2013. STATEMENT REGARDING FEDERALLY SPONSORED RESEARCH OR DEVELOPMENT. Not Applicable. THE NAMES OF THE PARTIES TO A JOINT RESEARCH AGREEMENT Not Applicable. INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB) Not Applicable. STATEMENT REGARDING PRIOR DISCLOSURES BY THE INVENTOR OR A JOINT INVENTOR. Not Applicable.

BACKGROUND OF THE INVENTION

The invention relates to a method for feeding feed material into a furnace space of a smelting furnace.

The invention also relates to an arrangement for feeding feed material into a furnace space of a smelting.

The method and the arrangement relates for example to feeding of granulated matter into an electric furnace. Publication WO 2008/087245 presents a method of and equipment for pretreating material that is fed into a smelting furnace such as an electric furnace.

The method and the arrangement relates also for example to feeding of fine-grained matter such as copper sulfide concentrate or copper matte and possible flux to into a reaction shaft of a suspension smelting furnace such as a flash smelting furnace or a direct-to-blister furnace. Publication WO 2005/067366 presents a supply system for a suspension smelting furnace.

BRIEF SUMMARY OF THE INVENTION

The object of the invention is to provide an improved method and an improved arrangement for feeding feed material into a furnace space of a smelting furnace.

Short Description of the Invention

Also disclosed is a method for feeding feed material from a bin for feed material into a furnace space of a smelting furnace of the invention
and preferred embodiments thereof.

Also disclosed is an arrangement for feeding feed material from a bin for feed material into a furnace space of a smelting furnace of the invention
and preferred embodiments thereof.

The method and arrangement makes possible online visualization of the feed of feed material. This gives the operator online information about any feed disturbances and online information about the feed distribution mass ratios.

The method and arrangement makes possible online measurement of moisture of the feed of feed material. This can be used for online moisture control of a dryer for regulating the moisture rate of feed material to be fed into the smelting furnace.

The method and arrangement makes possible online velocity measurement of the feed of feed material by arranging a first sensor (or a first set of first sensors) and a second sensor (or a second set of second sensors) in the feed material feeding arrangement and by arranging the first sensor (or the first set of first sensors) upstream of the second sensor (or the second set of second sensors) in the feed material feeding arrangement. This can be used for online feed rate control of feed material and for online feed distribution control.

BRIEF DESCRIPTION OF THE SEVERAL VIEWS OF THE DRAWINGS

In the following the invention will described in more detail by referring to the figures, of which

DETAILED DESCRIPTION OF THE INVENTION

Figure 1:
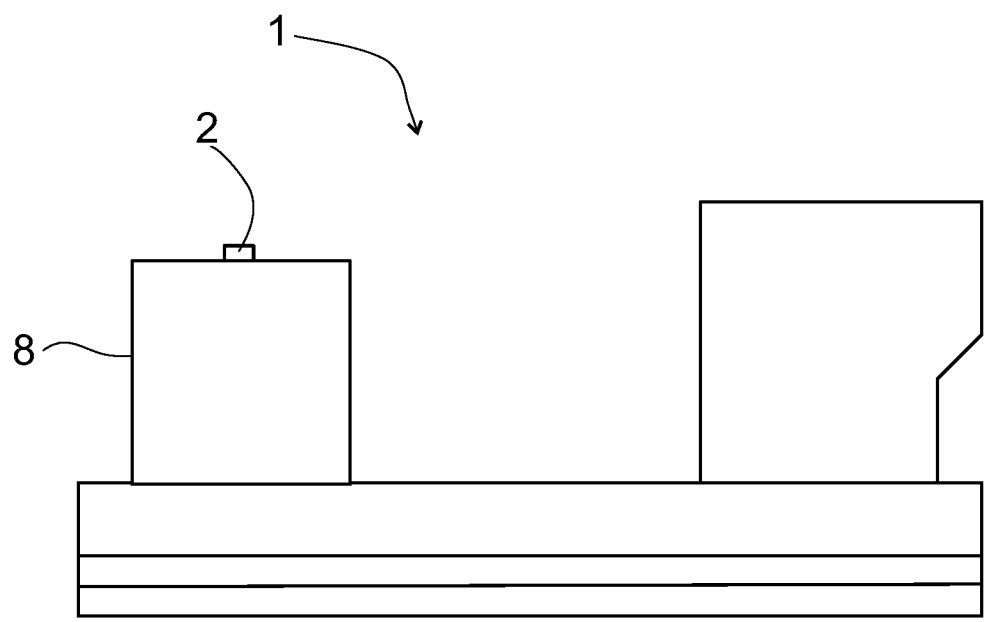
FIG. 1 shows a suspension smelting furnace provided with a concentrate or matte burner.

The invention relates to a method and to an arrangement for feeding feed material from a bin 10 for feed material into a furnace space (not marked with a reference numeral) of a smelting furnace.

A purpose of the method and the arrangement can be to feed feed material in the form of fine-grained matter such as concentrate or matte from a bin 10 for feed material into a reaction shaft of a suspension smelting furnace 1 as is illustrated in FIGS. 2 to 14.

Figure 15:
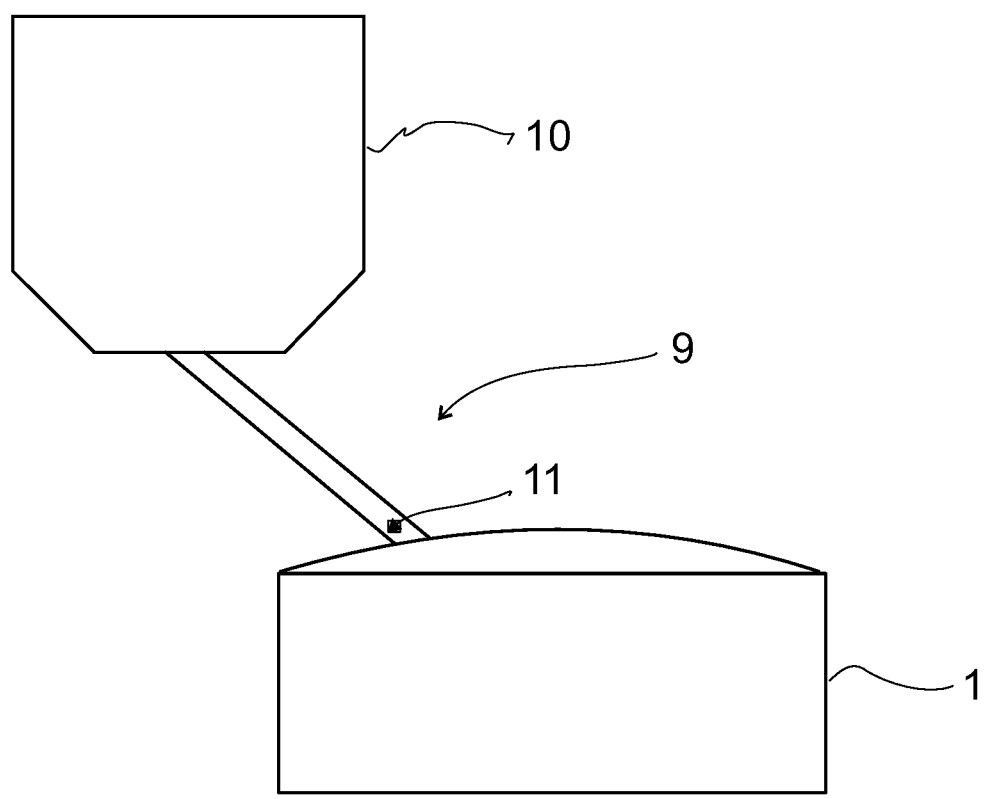
FIG. 15 shows an arrangement for feeding feed material from a bin for feed material into an electric furnace.

A purpose of the method and the arrangement can be to feed feed material in the form of granulated matter from a bin 10 for feed material into an electric furnace 1 as is illustrated in FIG. 15.

First the method and some preferred embodiments and variants thereof will be described in greater detail.

The method comprises a first providing step for providing a feed material feeding arrangement 9 for feeding feed material from the bin 10 for feed material into the furnace space of the smelting furnace 1.

The method comprises additionally a feeding step for feeding feed material from the bin 10 for feed material into the furnace space of the smelting furnace 1.

The method comprises additionally a second providing step for providing at least one sensor 11 for measuring flow of feed material at a position between the bin 10 for feed material and the furnace space of the smelting furnace 1.

The method comprises additionally a measuring step for measuring flow of feed material by means of said at least one sensor 11 at said position.

In some embodiments of the method the feed material is in the form of fine-grained matter such as concentrate or matte. In such embodiments of the method, the smelting furnace is a suspension smelting furnace 1 comprising a concentrate or matte burner 2 having reaction gas feeding means 3 and fine-grained matter feeding means 4. The fine-grained matter feeding means 4 of the concentrate or matte burner 2 comprises a fine-grained matter feed pipe 12 having a perimeter 5 and having a discharge opening 7 that opens into a reaction shaft 8 of the suspension smelting furnace 1. In such embodiments the first providing step for providing a feed material feeding arrangement 9 for feeding feed material from the bin 10 for feed material into the furnace space of the smelting furnace 1 is a step for providing a feed material feeding arrangement 9 for feeding fine-grained matter from the bin 10 for feed material into the fine-grained matter feeding means 4 of the concentrate or matte burner 2. In such embodiments the feeding step for feeding feed material from the bin 10 for feed material into the furnace space the smelting furnace is a step for feeding fine-grained matter from the bin 10 for feed material into the fine-grained matter feeding means 4 of the concentrate or matte burner 2 and for feeding fine-grained matter by means of the fine-grained matter feeding means 4 of the concentrate or matte burner 2 into the reaction shaft 8 of the suspension smelting furnace 1 i.e. into a furnace space of the suspension smelting furnace 1. In such embodiments the second providing step for providing at least one sensor 11 for measuring flow of feed material at a position between the bin 10 for feed material and the furnace space of the smelting furnace 1 is a step for providing at least one sensor 11 for measuring flow of fine-grained matter at a position between the bin 10 for feed matter and the discharge opening 7 of the fine-grained matter feed pipe 12 of the fine-grained matter feeding means 4 of the concentrate or matte burner 2. In such embodiments the measuring step for measuring flow of feed material by means of said at least one sensor 11 at said position is a step for measuring flow of feed material by means of said at least one sensor 11 at said position between the bin 10 for feed matter and the discharge opening 7 of the fine-grained matter feed pipe 12 of the fine-grained matter feeding means 4 of the concentrate or matte burner 2.

If the smelting furnace is a suspension smelting furnace as described earlier, the second providing step of the method may comprise providing the perimeter 5 of the fine-grained matter feed pipe 12 of the fine-grained matter feeding means 4 of the concentrate or matte burner 2 with at least one sensor 11 for measuring flow of fine-grained matter in the fine-grained matter feed pipe 12 of the fine-grained matter feeding means 4 of the concentrate or matte burner 2. It is for example possible in the embodiments shown in FIGS. 2 to 8, to provide the perimeter 5 of the fine-grained matter feed pipe 12 of the fine-grained matter feeding means 4 of the concentrate or matte burner 2 with at least one sensor 11 for measuring flow of fine-grained matter in the fine-grained matter feed pipe 12 of the fine-grained matter feeding means 4 of the concentrate or matte burner 2.

Figure 12:
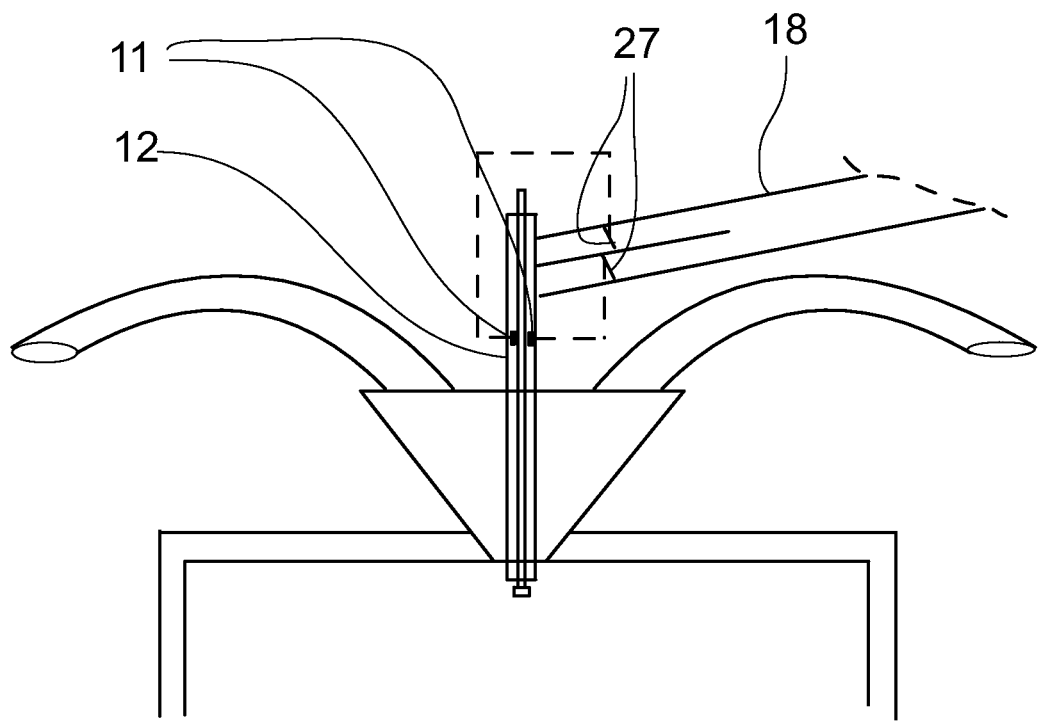
FIG. 12 shows an arrangement where the downstream end of a closed air slide conveyor of a feed material feeding arrangement is divided into feed channels each of which is provided with adjustable damper means and where a feed pipe of a fine-grained matter feeding means of a concentrate or matte burner is divided into sectors each of which is provided with sensors.
Figure 13:
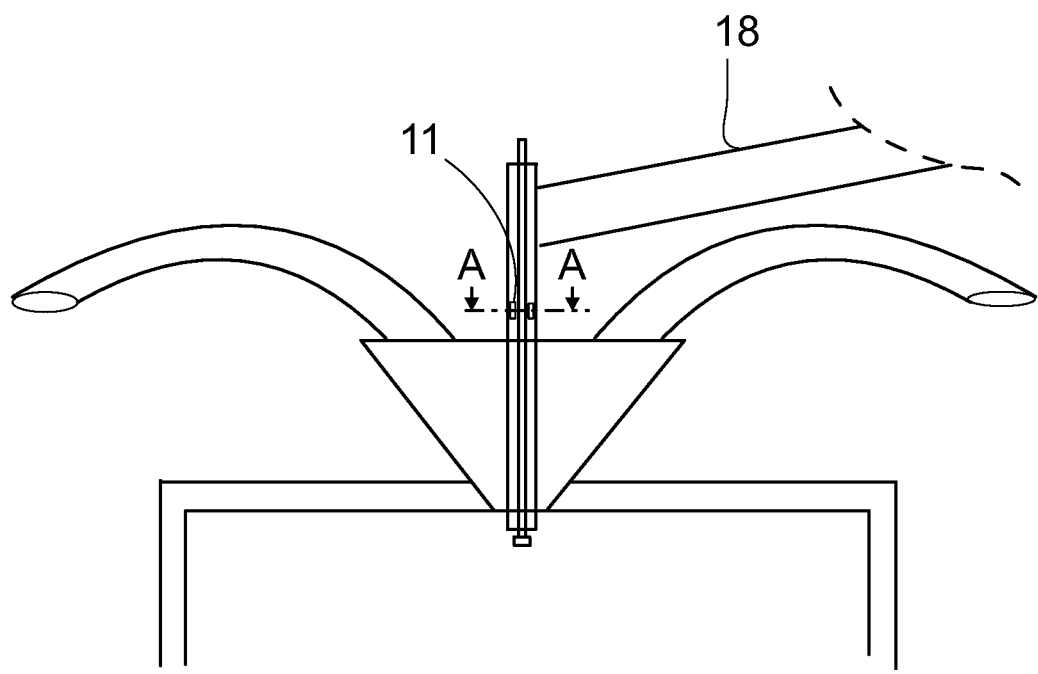
FIG. 13 shows a concentrate or matte burner having a feed pipe of the fine-grained feeding means divided into sectors and where each sector is provided with sensors for independently measuring the flow of feed material in the form of fine-grained matter within each sector.

If the smelting furnace is a suspension smelting furnace as described earlier, the suspension smelting furnace 1 may in some embodiments comprise a concentrate or matte burner 2, where the feed pipe 12 of the fine-grained matter feeding means 4 of the concentrate or matte burner 2 is divided into sectors 13. In such embodiment of the method the second providing step may comprise providing each sector 13 with at least one sensor 11 for independently measuring flow within each sector 13. Such an embodiment is shown in FIGS. 12 and 13. The method may in some embodiments comprise providing a suspension smelting furnace 1 comprising a concentrate or matte burner 2 having the feed pipe 12 of the fine-grained matter feeding means 4 divided into sectors 13. In a such embodiment the second providing step includes providing each sector 13 of the feed pipe 12 with at least one sensor 11 for independently measuring flow of fine-grained matter within each sector 13 of the feed pipe 12. In a such embodiment the method includes providing each sector 13 of the feed pipe 12 with an adjustable damper means 27 for independently adjusting the flow of fine-grained matter within each sector 13 of the feed pipe 12. In a such embodiment the feeding step includes independently adjusting the flow of fine-grained matter within each sector 13 of the feed pipe 12 by means of the adjustable damper means 27 provided in each sector 13 of the feed pipe 12 based on the flow of fine-grained matter independently measured within in each sector 13 of the feed pipe 12 by means of said at least one sensor 11 provided in each sector 13 of the feed pipe 12 in said measuring step. Such adjustable damper means 27 may be used for adjusting the distribution of the fine-grained matter in the concentrate or matte burner 2 and how the fine-grained matter is fed by means the concentrate or matte burner 2 into the reaction shaft 8 of the suspension smelting furnace.

The method may in some embodiments comprise providing a suspension smelting furnace 1 comprising a concentrate or matte burner 2 having the feed pipe 12 of the fine-grained matter feeding means 4 divided into sectors. In a such embodiment the second providing step includes providing each sector 13 of the feed pipe 12 with at least one sensor 11 for independently measuring flow of fine-grained matter within each sector 13 of the feed pipe 12. In a such embodiment the first providing step includes providing a feed material feeding arrangement 9 having a downstream end in communication with the fine-grained matter feeding means 4 of the concentrate or matte burner 2, which downstream end is provided with partition means 28 for dividing the downstream end of the feed material feeding arrangement 9 into several feed channels 29 each feed channel 29 ending into a sector 13 of the feed pipe 12 of the fine-grained matter feeding means 4 of the concentrate or matte burner 2. A such embodiment includes providing each feed channel 29 of the feed material feeding arrangement 9 with an adjustable damper means 27 for independently adjusting the flow of fine-grained matter within each feed channel 29 of the feed material feeding arrangement 9. In a such embodiment the feeding step includes independently adjusting the flow of fine-grained matter within each feed channel 29 of the feed material feeding arrangement 9 by means of the adjustable damper means 27 provided in each feed channel 29 of the feed material feeding arrangement 9 based on the flow of fine-grained matter independently measured within each sector 13 of the feed pipe 12 by means of said at least one sensor 11 provided in each sector 13 of the feed pipe 12 in said measuring step. A such embodiment is shown in FIG. 12. In FIG. 12 the downstream end of the feed material feeding arrangement 9 is formed by a closed air slide conveyor 18 so that the downstream end of the closed air slide conveyor 18 is divided by partition means 28 into several feed channels 29. Such adjustable damper means 27 may be used for adjusting the distribution of the fine-grained matter in the concentrate or matte burner 2 and how the fine-grained matter is fed by means the concentrate or matte burner 2 into the reaction shaft 8 of the suspension smelting furnace.

Figure 11:
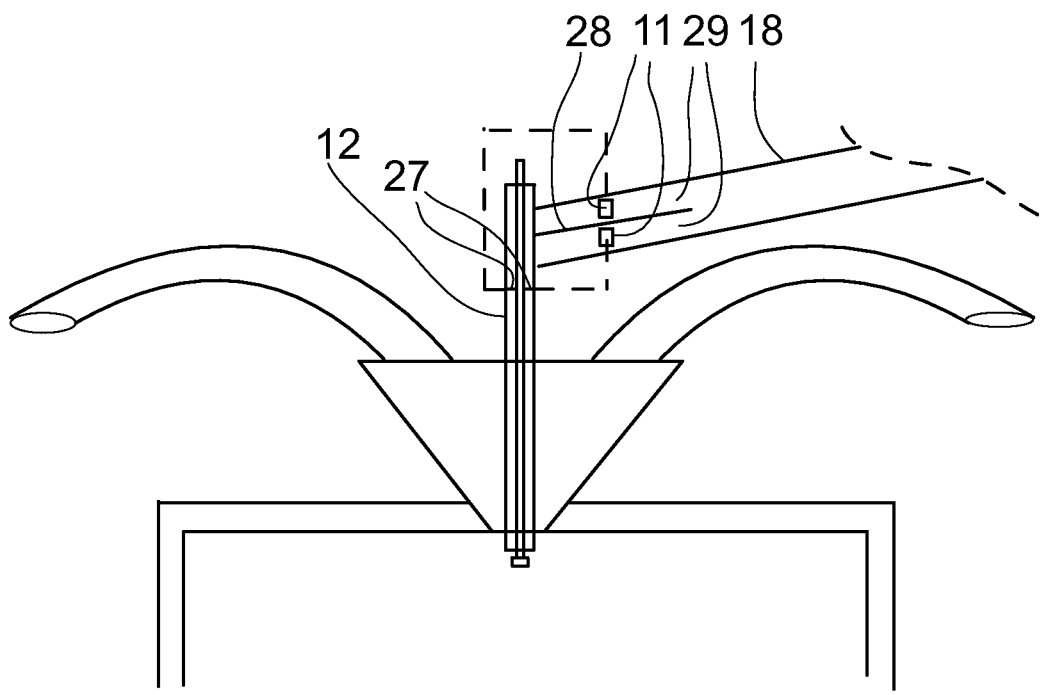
FIG. 11 shows an arrangement where the downstream end of a closed air slide conveyor of a feed material feeding arrangement is divided into feed channels each of which is provided with sensors and where a feed pipe of a fine-grained matter feeding means of a concentrate or matte burner is divided into sectors each of which is provided with adjustable damper means.

The method may in some embodiments comprise providing a suspension smelting furnace 1 comprising a concentrate or matte burner 2 having the feed pipe 12 of the fine-grained matter feeding means 4 divided into sectors. In a such embodiment the first providing step includes providing a feed material feeding arrangement 9 having a downstream end in communication with the fine-grained matter feeding means 4 of the concentrate or matte burner 2, which downstream end is provided with partition means 28 for dividing the downstream end of the feed material feeding arrangement 9 into several feed channels 29 each feed channel 29 ending into a sector 13 of the feed pipe 12 of the fine-grained matter feeding means 4 of the concentrate or matte burner 2. In a such embodiment the second providing step includes providing each feed channel 29 of the feed material feeding arrangement 9 with at least one sensor 11 for independently measuring flow of fine-grained matter within each feed channel 29 of the feed material feeding arrangement 9. In a such embodiment the measuring step includes independently measuring flow of fine-grained matter within each feed channel 29 of the feed material feeding arrangement 9. A such embodiment includes providing each sector 13 of the feed pipe 12 with an adjustable damper means 27 for independently adjusting the flow of fine-grained matter within each sector 13 of the feed pipe 12. In a such embodiment the feeding step includes independently adjusting the flow of fine-grained matter within each sector 13 of the feed pipe 12 by means of the adjustable damper means 27 provided in each sector 13 of the feed pipe 12 based on the flow of fine-grained matter independently measured within each feed channel 29 of the feed material feeding arrangement 9 by means of said at least one sensor 11 provided in each feed channel 29 of the feed material feeding arrangement 9 in said measuring step. A such embodiment is shown in FIG. 11. In FIG. 11 the downstream end of the feed material feeding arrangement 9 is formed by a closed air slide conveyor 18 so that the downstream end of the closed air slide conveyor 18 is divided by partition means 28 into several feed channels 29. Such adjustable damper means 27 may be used for adjusting the distribution of the fine-grained matter in the concentrate or matte burner 2 and how the fine-grained matter is fed by means the concentrate or matte burner 2 into the reaction shaft 8 of the suspension smelting furnace.

If the smelting furnace is a suspension smelting furnace as described earlier, the suspension smelting furnace may, as shown in FIGS. 2 to 14, comprise a concentrate or matte burner 2 having reaction gas feeding means 3 comprising an annular gas feeding channel 15 that surrounds the solid matter feed pipe 12 and having an annular gas discharge opening 16 opening into the reaction shaft 8 of the suspension smelting furnace 1.

If the smelting furnace is a suspension smelting furnace as described earlier, the suspension smelting furnace may, as shown in FIGS. 2 to 14, comprise a concentrate or matte burner 2 comprising a concentrate distributor 17 extending out from the discharge opening 7 of the solid matter feed pipe 12 and into the reaction shaft 8 of the suspension smelting furnace 1.

If the smelting furnace is a suspension smelting furnace as described earlier, the first providing step may in some embodiments of the method, as in the embodiments shown in FIGS. 4 to 8, comprise providing a feed material feeding arrangement 9 comprising a closed air slide conveyor 18 in communication with the fine-grained matter feeding means 4 of the concentrate or matte burner 2. In such embodiments, the feeding step of the method comprises feeding the fine-grained matter into the fine-grained matter feeding means 4 of the concentrate or matte burner 2 by means of the closed air slide conveyor 18. In such embodiments the second providing step may comprise providing at least one sensor 11 for measuring flow of fine-grained matter in closed air slide conveyor 18 of the feed material feeding arrangement 9. It is for example possible that in the embodiments shown in FIGS. 4 to 8, to provide the closed air slide conveyor 18 with at least one sensor 11 for measuring flow of fine-grained matter in the closed air slide conveyor 18.

Figure 2:
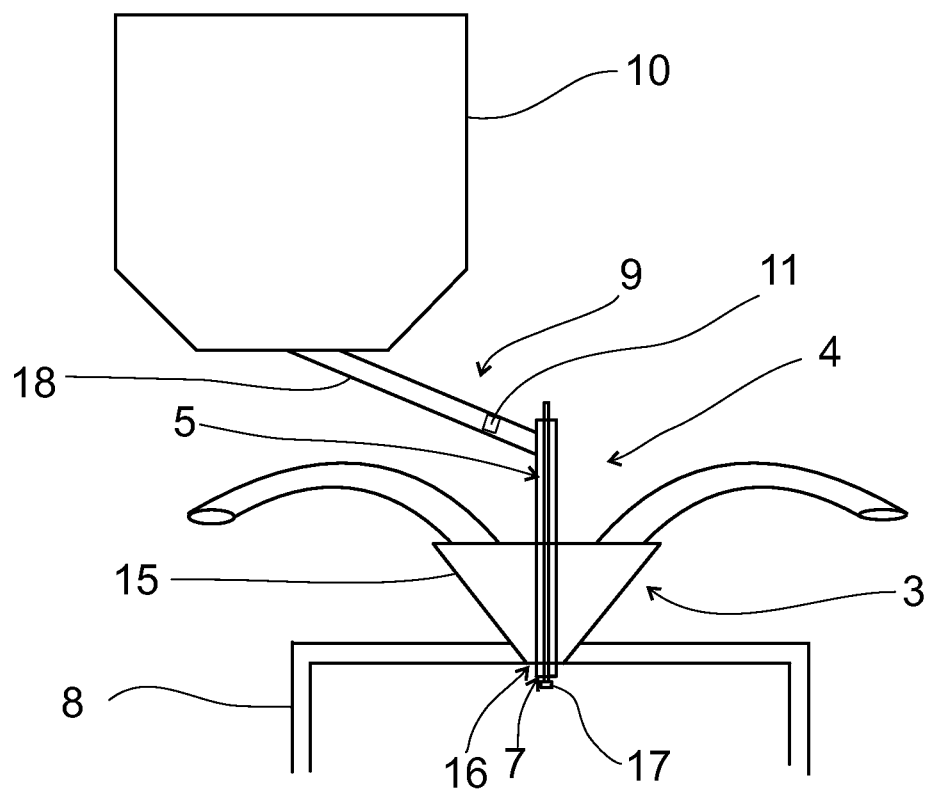
FIG. 2 shows an arrangement for feeding feed material in the form of fine-grained matter from a bin for feed material into a reaction shaft of a suspension smelting furnace according to a first embodiment.

In an embodiment of the method, such as in the first embodiment shown in FIG. 2, the first providing step comprises providing a feed material feeding arrangement 9, where the bin 10 for fine grained-matter is configured for feeding the fine-grained matter into a closed air slide conveyor 18 and where the closed air slide conveyor 18 is configured for feeding the fine-grained matter into the fine-grained matter feeding means 4 of the concentrate or matte burner 2. In this embodiment of the method the feeding step comprises feeding fine-grained matter into the closed air slide conveyor 18 from the bin 10 for fine grained-matter and feeding fine-grained matter from the closed air slide conveyor 18 into the fine-grained matter feeding means 4 of the concentrate or matte burner 2.

Figure 3:
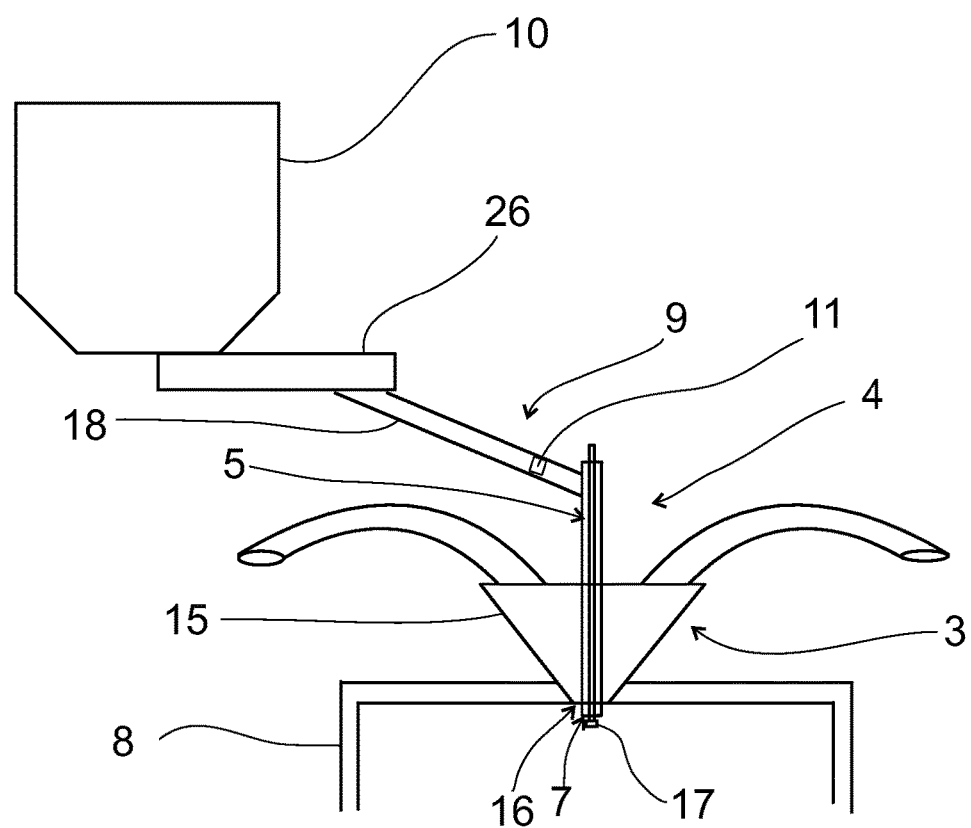
FIG. 3 shows an arrangement for feeding feed material in the form of fine-grained matter from a bin for feed material into a reaction shaft of a suspension smelting furnace according to a second embodiment.

In an embodiment of the method, such as in the second embodiment shown in FIG. 3, the first providing step comprises providing a feed material feeding arrangement 9, where the bin 10 for fine grained-matter is configured for feeding the fine-grained matter into a conveyor 26 for feeding fine-grained matter into a closed air slide conveyor 18 and where the closed air slide conveyor 18 is configured for feeding the fine-grained matter into the fine-grained matter feeding means 4 of the concentrate or matte burner 2. In this embodiment of the method the feeding step comprises feeding fine-grained matter into the conveyor 26 from the bin 10 for fine grained-matter and feeding fine-grained matter from the conveyor 26 into closed air slide conveyor 18 and feeding fine-grained matter from the closed air slide conveyor 18 into the fine-grained matter feeding means 4 of the concentrate or matte burner 2.

Figure 4:
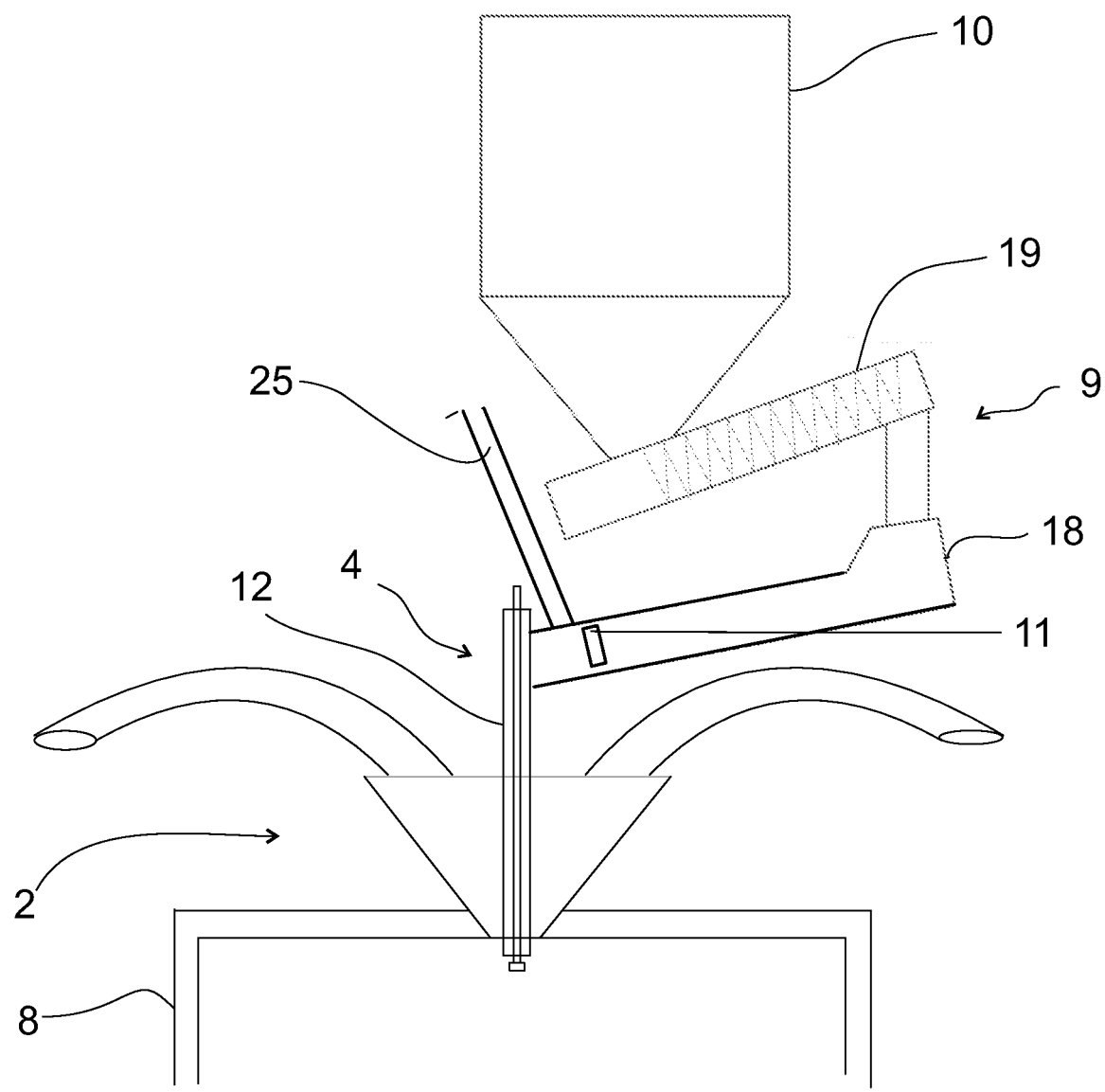
FIG. 4 shows an arrangement for feeding feed material in the form of fine-grained matter from a bin for feed material into a reaction shaft of a suspension smelting furnace according to a third embodiment.

The first providing step may in some embodiments of the method comprise providing a feed material feeding arrangement 9 comprising a controlling means 19, such as a screw conveyor (as in the embodiment shown in FIGS. 4 to 8), a hose valve or a rotary valve or a multiple of these, in communication with the closed air slide conveyor 18. In such embodiments the feeding step comprises feeding fine-grained matter into the closed air slide conveyor 18 from the controlling means 19. In these embodiments it is beneficial, but not necessary, that the first providing step comprises providing a fine-grained matter feeding means 4 comprising an additional fine-grained matter feeding arrangement 25 for feeding additional fine-grained matter into the fine-grained matter feeding means 4 downstream of the at least one sensor 11 and that the method consequently comprises a second feeding step for feeding additional fine-grained matter into the fine-grained matter feeding means 4 by means of said additional fine-grained feeding arrangement 25. A such embodiment is shown in FIG. 4. Such additional fine-grained matter may comprise at least one of the following: Silica, lime, limestone, reverts (i.e. ground mixture of recycled products and slag mixture), dust, electronic scrap, and solid coolant.

In an embodiment of the method, such as in the third embodiment shown in FIG. 4, the first providing step comprises providing a feed material feeding arrangement 9 where the bin 10 for fine grained-matter is configured for feeding the fine-grained matter into the controlling means 19 and where the controlling means 19 is configured for controlling the fine-grained matter into a closed air slide conveyor 18 and where the closed air slide conveyor 18 is configured for feeding fine-grained matter into the fine-grained matter feeding means 4 of the concentrate or matte burner 2. In this embodiment of the method the feeding step comprises feeding fine-grained matter into the controlling means 19 from the bin 10 for fine grained-matter and feeding fine-grained matter from the controlling means 19 into the closed air slide conveyor 18. In this embodiment of the method the feeding step comprises additionally feeding fine-grained matter from the closed air slide conveyor 18 into the fine-grained matter feeding means 4 of the concentrate or matte burner 2.

In embodiments, where the bin 10 for fine grained-matter is configured for feeding the fine-grained matter using a controlling means 19 such as a screw conveyor (as in the second embodiment shown in FIG. 3), hose valve or rotary valve or multiples of these, the first providing step may comprise providing a loss-in-weight controller 20 between the bin 10 for fine grained-matter and the controlling means 19, for controlling feed of fine-grained matter from the bin 10 for fine grained-matter into the air slide conveyor 18. In such case, the method comprises additionally a controlling step for controlling feed of fine-grained matter from the bin 10 for fine grained-matter through controlling means 19 by means of the loss-in-weight controller 20.

Figure 5:
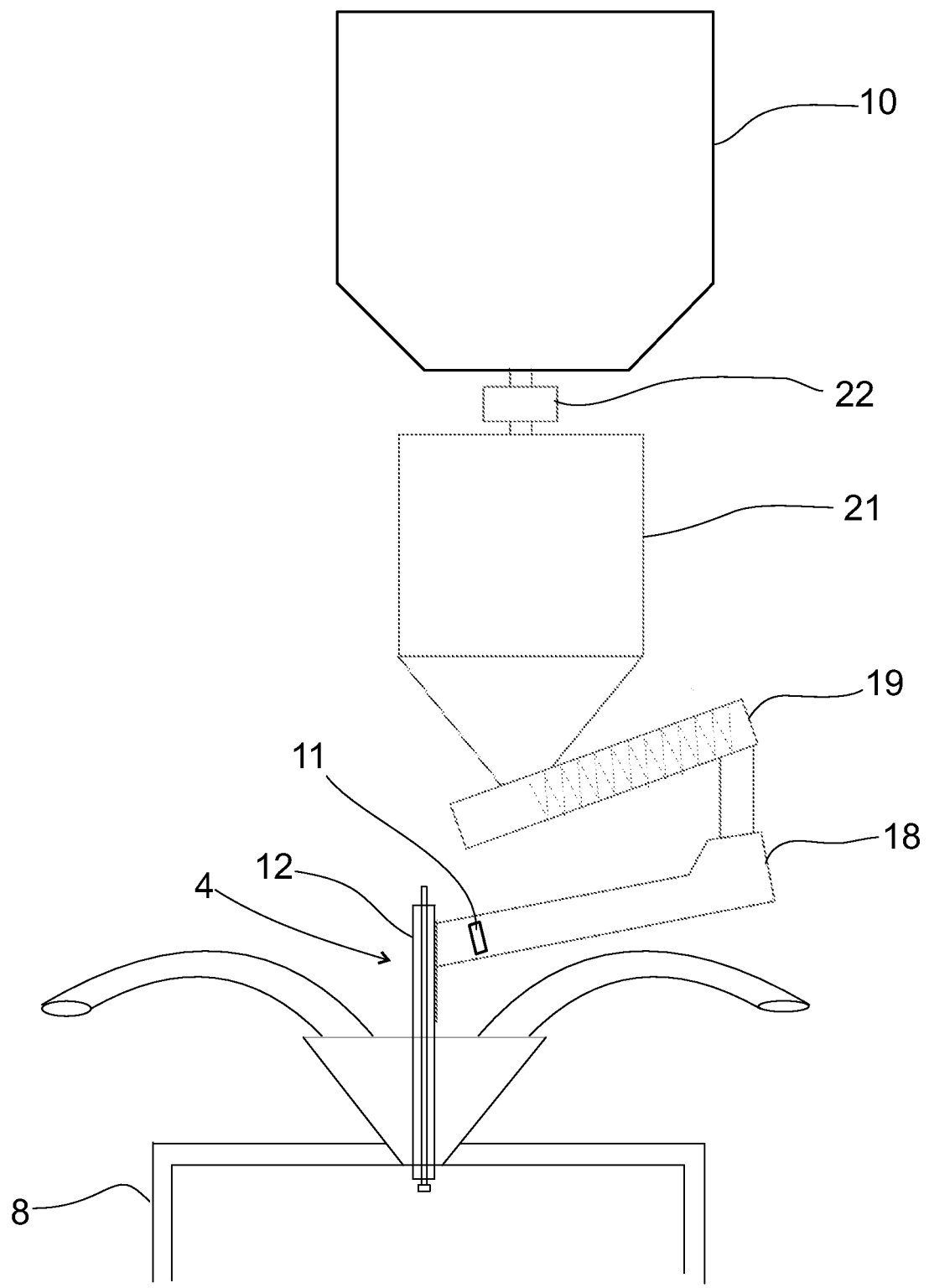
FIG. 5 shows an arrangement for feeding feed material in the form of fine-grained matter from a bin for feed material into a reaction shaft of a suspension smelting furnace according to a fourth embodiment.

The first providing step may in some embodiments of the method, as in the fourth embodiment shown in FIG. 5, comprise providing a feed material feeding arrangement 9, where the bin 10 for fine grained-matter is configured for feeding the fine-grained matter into a dosing bin 21, and where a valve means 22 is provided between the bin 10 for fine grained-matter and the dosing bin 21 for opening and closing the communication between the bin 10 for fine grained-matter and the dosing bin 21. In such embodiments the feeding step comprises opening the valve means 22 before feeding fine-grained matter from the bin 10 for fine grained-matter into the dosing bin 21 and at least during but not restricted to this step the controlling means 19 can be regulated using the information from the sensor 11.

Figure 7:
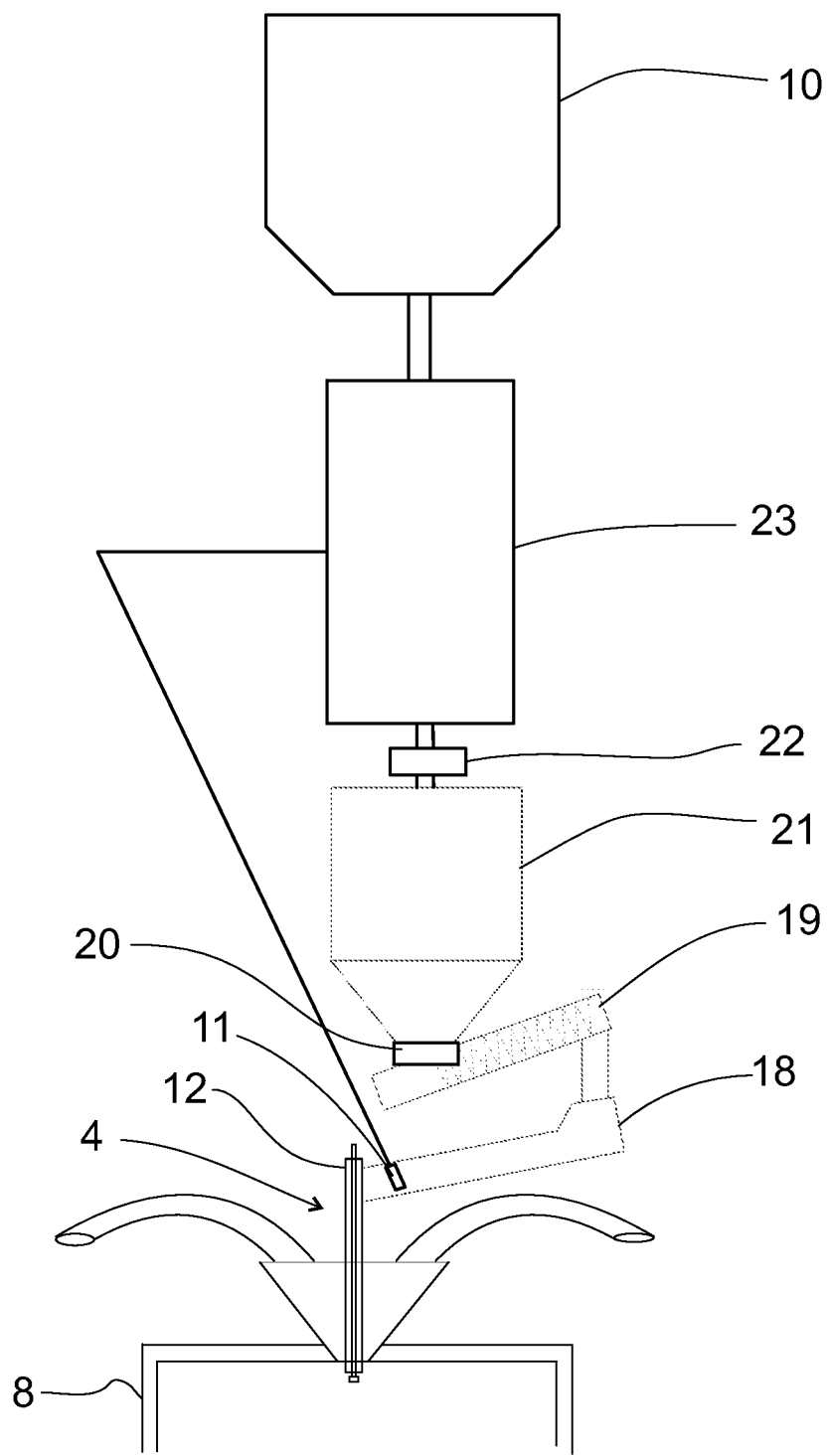
FIG. 7 shows an arrangement for feeding feed material in the form of fine-grained matter from a bin for feed material into a reaction shaft of a suspension smelting furnace according to a sixth embodiment.

The first providing step may in some embodiments of the method, as in the sixth embodiment shown in FIG. 7, comprise providing a feed material feeding arrangement 9 comprising a dryer 23 between the bin 10 for fine grained-matter and the dosing bin 21, which the dryer 23 is configured for regulating the moisture rate of fine-grained matter. In such embodiments the method the feeding step comprises feeding fine-grained matter into the dryer 23 from the bin 10 for fine grained-matter, and feeding fine-grained matter from the dryer 23 into the dosing bin 21. Such embodiments of the method comprises additionally a regulating step for regulating the moisture rate of fine-grained matter by means of the dryer 23.

Figure 6:
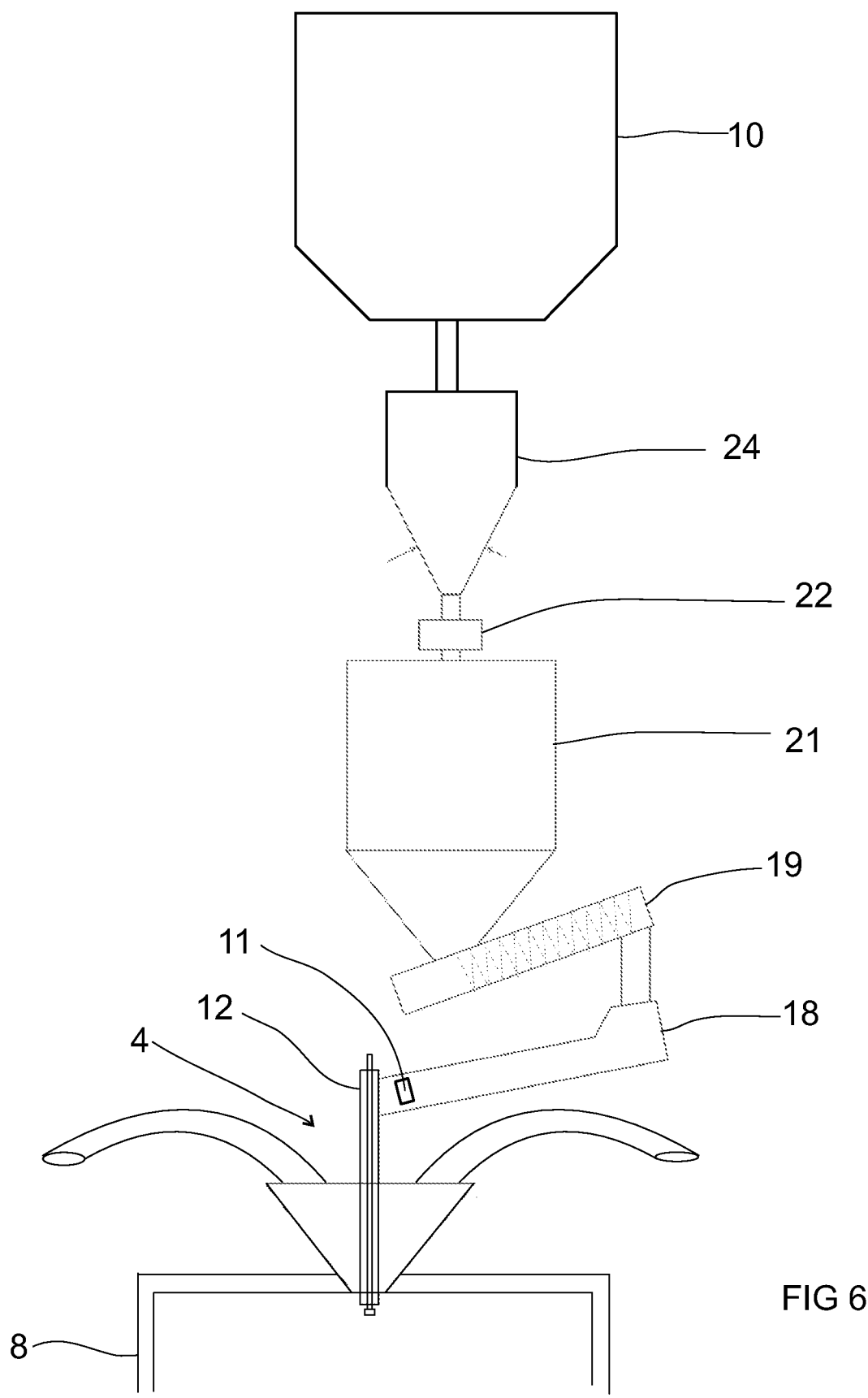
FIG. 6 shows an arrangement for feeding feed material in the form of fine-grained matter from a bin for feed material into a reaction shaft of a suspension smelting furnace according to a fifth embodiment.

The first providing step may in some embodiments of the method, as in the fifth embodiment shown in FIG. 6, comprise providing a feed material feeding arrangement 9 comprising a fluidization means 24 between the bin 10 for fine grained-matter and the dosing bin 21, and a filing valve 22 between the fluidization means 24 and the dosing bin 21 for opening and closing the communication between the fluidization means 24 and the dosing bin 21. In such embodiments of the method, the feeding step comprises feeding fine-grained matter into the fluidization means 24 from the bin 10 for fine-grained matter, and feeding fine-grained matter from the fluidization means 24 into the dosing bin 21. Such embodiments of the method comprises additionally a fluidization step for fluidizing fine-grained matter in the fluidization means 24.

Figure 8:
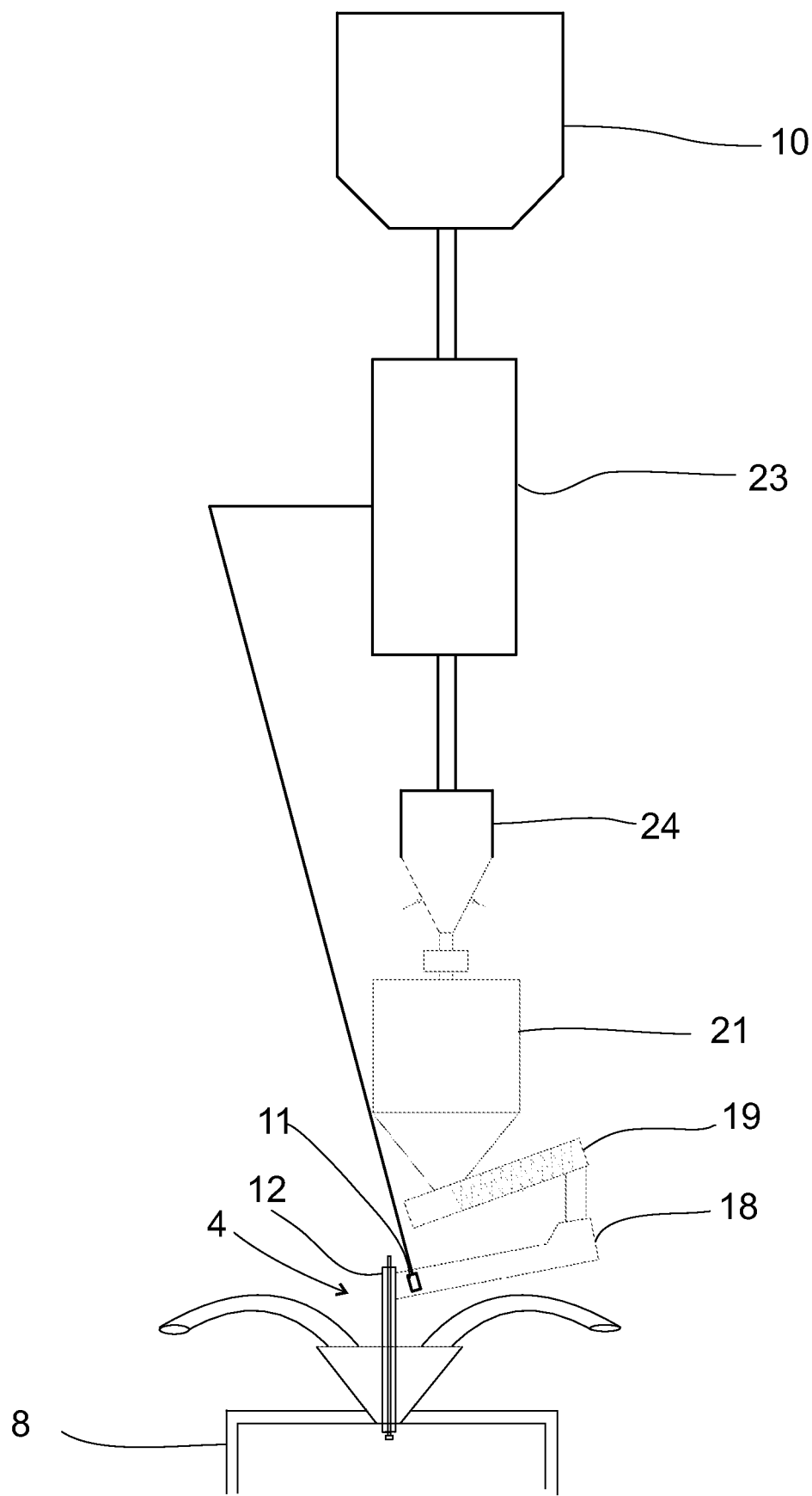
FIG. 8 shows an arrangement for feeding feed material in the form of fine-grained matter from a bin for feed material into a reaction shaft of a suspension smelting furnace according to a sixth embodiment.
Figure 9:
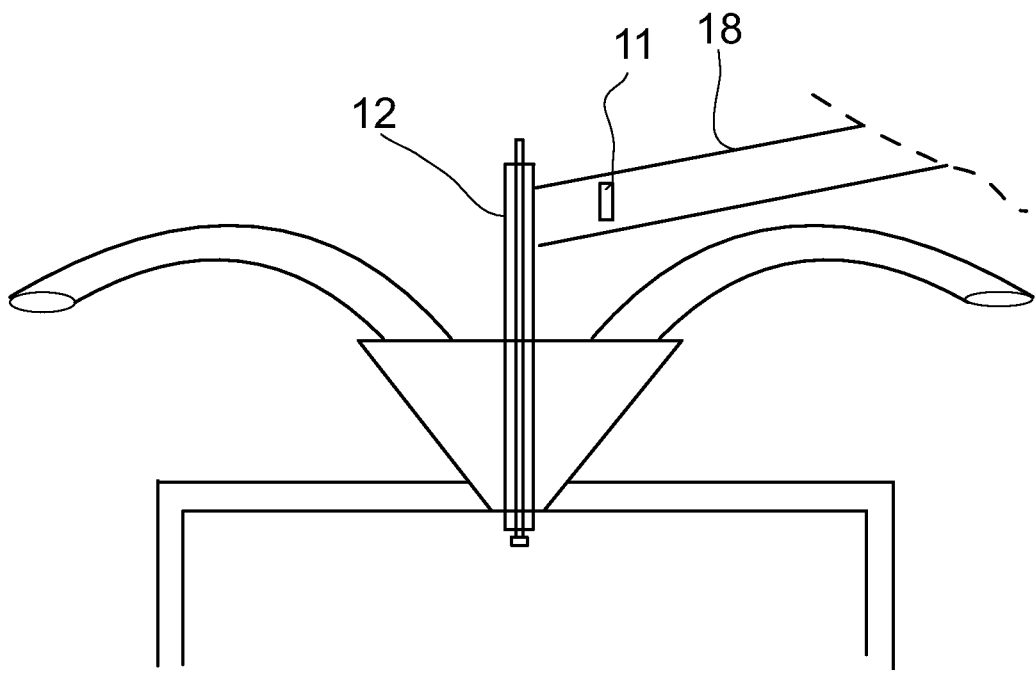
FIG. 9 shows an arrangement where a closed air slide conveyor for feeding feed material in the form of fine-grained matter into a concentrate or matte burner is provided with sensors.
Figure 10:
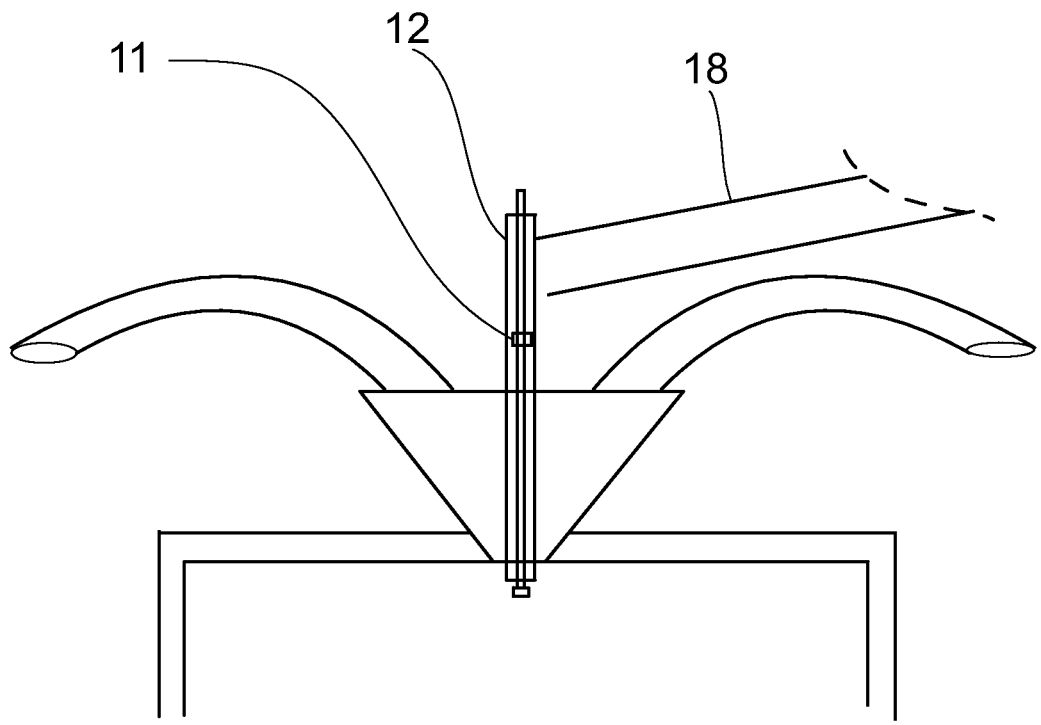
FIG. 10 shows a concentrate or matte burner that is provided with sensors.

The first providing step may in some embodiments of the method, as in the seventh embodiment shown in FIG. 8, comprise providing a feed material feeding arrangement 9 comprising both a dryer 23 and a fluidization means 24 between the bin 10 for fine grained-matter and the dosing bin 21, and a first filling valve between the fluidization means 24 and the dosing bin 21 for opening and closing the communication between the fluidization means 24 and the dosing bin 21. In such embodiments of the method, the feeding step comprises feeding fine-grained matter into the dryer 23 from the bin 10 for fine grained-matter, feeding fine-grained matter from the dryer 23 into the fluidization means 24, and feeding fine-grained matter from the fluidization means 24 into the dosing bin 21. Such embodiments of the method comprises additionally a regulating step for regulating the moisture rate of fine-grained matter by means of the dryer 23. Such embodiments of the method comprises additionally a fluidization step for fluidizing fine-grained matter in the fluidization means 24.

If the first providing step comprises providing a feed material feeding arrangement 9 comprising a dryer 23, the second providing step comprises preferably, but not necessarily, functionally connecting at least one sensor 11 and the dryer 23, and the method comprises a regulating step for regulating the dryer 23 on the basis of the flow of fine-grained matter measured by said sensor 11 functionally connected to the dryer 23.

In the method, the feed material may be in the form of granulated material and the smelting furnace may be an electric furnace as shown in FIG. 15. In such embodiments, the feeding step includes feeding feed material from the bin 10 for feed material into a furnace space of the electric furnace.

The second providing step comprises preferably, but not necessarily, providing a sensor 11 comprising at least one of the following: a tomography sensor such as an electrical capacitance tomography measuring sensor, an ultrasonic tomography measuring sensor, a radiometric sensor, and a microwave sensor.

Next the arrangement and some preferred embodiments and variants thereof will be described in greater detail.

The arrangement comprises a feed material feeding arrangement 9 for feeding feed material from the bin 10 for feed material into the furnace space of the smelting furnace 1.

The arrangement comprises at least one sensor 11 for measuring flow of feed material being arranged between the bin 10 for feed material and the furnace space of the smelting furnace 1.

In some embodiments of the arrangement the feed material is in the form of fine-grained matter such as concentrate or matte and the smelting furnace is in the form of a suspension smelting furnace comprising a reaction shaft 8 and a concentrate or matte burner 2 having reaction gas feeding means 3 and fine-grained matter feeding means 4. In such embodiments the fine-grained matter feeding means 4 of the concentrate or matte burner 2 comprises a fine-grained matter feed pipe 12 having a perimeter 5 and having a discharge opening 7 that opens into the reaction shaft 8 of the suspension smelting furnace 1 i.e. into a furnace space of the suspension smelting furnace. In such embodiments the feed material feeding arrangement 9 for feeding feed material from the bin 10 for feed material into the furnace space of the smelting furnace 1 are configured for feeding fine-grained matter from the bin 10 for feed material into the fine-grained matter feeding means 4 of the concentrate or matte burner 2 for further feeding into the reaction shaft 8 of the suspension smelting furnace 1. In such embodiments said at least one sensor 11 for measuring flow of feed material between the bin 10 for feed material and the furnace space of the smelting furnace 1 is arranged between the bin 10 for fine-grained matter and the discharge opening 7 of the fine-grained matter feed pipe 12 of the fine-grained matter feeding means 4 of the concentrate or matte burner 2.

If the smelting furnace is in the form of a suspension smelting furnace as described earlier, the perimeter 5 of the solid matter feed pipe 12 may be provided with at least one sensor 11 for measuring flow of fine-grained matter in the solid matter feed pipe 12. It is for example possible that in the embodiments shown in FIGS. 2 to 8, the perimeter 5 of the fine-grained matter feed pipe 12 of the fine-grained matter feeding means 4 of the concentrate or matte burner 2 is provided with at least one sensor 11 for measuring flow of fine-grained matter in the fine-grained matter feed pipe 12 of the fine-grained matter feeding means 4 of the concentrate or matte burner 2.

Figure 14:
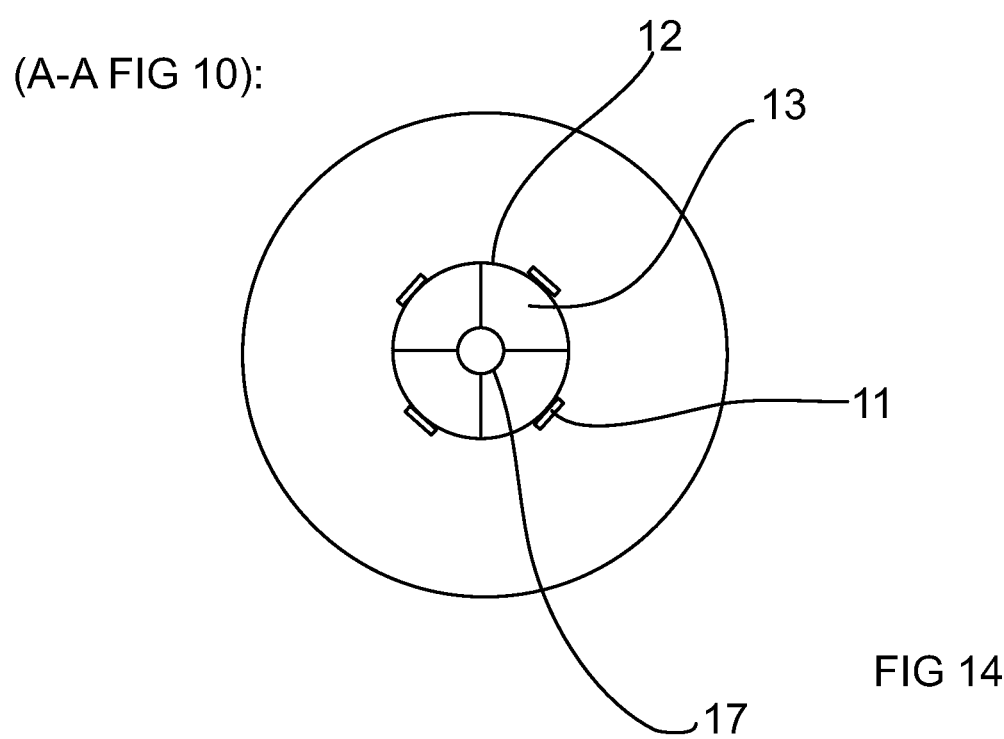
FIG. 14 shows the concentrate or matte burner shown in FIG. 11 cut along line A-A in FIG. 13.

If the smelting furnace is in the form of a suspension smelting furnace as described earlier, the feed pipe 12 of the concentrate or matte burner 2 may be divided into sectors 12 and each sector 13 may be provided with at least one sensor 11 for independently measuring flow within each sector 13. Such an embodiment is shown in FIGS. 13 and 14.

In an embodiment of the arrangement the suspension smelting furnace 1 comprises a concentrate or matte burner 2 having the feed pipe 12 of the fine-grained matter feeding means 4 divided into sectors 13. In this embodiment of the arrangement each sector 13 of the feed pipe 12 is provided with at least one sensor 11 for independently measuring flow of fine-grained matter within each sector 13 of the feed pipe 12. In this embodiment of the arrangement each sector 13 of the feed pipe 12 is provided with an adjustable damper means 27 for independently adjusting the flow of fine-grained matter within each sector 13 of the feed pipe 12. In this embodiment of the arrangement each sensor 11 of each sector 13 of the feed pipe 12 may be functionally connected to at least one adjustable damper means 27 in a sector 13 of the feed pipe 12. Such adjustable damper means 27 may be used for adjusting the distribution of the fine-grained matter in the concentrate or matte burner 2 and how the fine-grained matter is fed by means the concentrate or matte burner 2 into the reaction shaft 8 of the suspension smelting furnace.

In an embodiment of the arrangement the suspension smelting furnace 1 comprises a concentrate or matte burner 2 having the feed pipe 12 of the fine-grained matter feeding means 4 divided into sectors 13. In this embodiment of the arrangement each sector 13 of the feed pipe 12 is provided with at least one sensor 11 for independently measuring flow of fine-grained matter within each sector 13 of the feed pipe 12. In this embodiment of the arrangement the feed material feeding arrangement 9 has a downstream end in communication with the fine-grained matter feeding means 4 of the concentrate or matte burner 2, which downstream end is provided with partition means 28 for dividing the downstream end of the feed material feeding arrangement 9 into several feed channels 29 each feed channel 29 ending into a sector 13 of the feed pipe 12 of the fine-grained matter feeding means 4 of the concentrate or matte burner 2. In this embodiment of the arrangement each feed channel 29 of the feed material feeding arrangement 9 is provided with an adjustable damper means 27 for independently adjusting the flow of fine-grained matter within each feed channel 29 of the feed material feeding arrangement 9. A such embodiment is shown in FIG. 12. In FIG. 12 the downstream end of the feed material feeding arrangement 9 is formed by a closed air slide conveyor 18 so that the downstream end of the closed air slide conveyor 18 is divided by partition means 28 into several feed channels 29. In this embodiment of the arrangement each adjustable damper means 27 in each feed channel 29 may be functionally connected to at least sensor 11 of a sector 13 of the feed pipe 12. Such adjustable damper means 27 may be used for adjusting the distribution of the fine-grained matter in the concentrate or matte burner 2 and how the fine-grained matter is fed by means the concentrate or matte burner 2 into the reaction shaft 8 of the suspension smelting furnace.

In an embodiment of the arrangement the suspension smelting furnace 1 comprises a concentrate or matte burner 2 having the feed pipe 12 of the fine-grained matter feeding means 4 divided into sectors 13. In this embodiment of the arrangement the feed material feeding arrangement 9 has a downstream end in communication with the fine-grained matter feeding means 4 of the concentrate or matte burner 2, which downstream end is provided with partition means 28 for dividing the downstream end of the feed material feeding arrangement 9 into several feed channels 29 each feed channel 29 ending into a sector 13 of the feed pipe 12 of the fine-grained matter feeding means 4 of the concentrate or matte burner 2. In this embodiment of the arrangement each feed channel 29 of the feed material feeding arrangement 9 is provided with at least one sensor 11 for independently measuring flow of fine-grained matter within each feed channel 29 of the feed material feeding arrangement 9. In this embodiment of the arrangement each sector 13 of the feed pipe 12 is provided with an adjustable damper means 27 for independently adjusting the flow of fine-grained matter within each sector 13 of the feed pipe 12. A such embodiment is shown in FIG. 11. In FIG. 11 the downstream end of the feed material feeding arrangement 9 is formed by a closed air slide conveyor 18 so that the downstream end of the closed air slide conveyor 18 is divided by partition means 28 into several feed channels 29. In this embodiment of the arrangement each adjustable damper means 27 in each sector 13 of the feed pipe 12 may be functionally connected to at least sensor 11 in each feed channel 29. Such adjustable damper means 27 may be used for adjusting the distribution of the fine-grained matter in the concentrate or matte burner 2 and how the fine-grained matter is fed by means the concentrate or matte burner 2 into the reaction shaft 8 of the suspension smelting furnace.

If the smelting furnace is in the form of a suspension smelting furnace as described earlier, the reaction gas feeding means 3 of the concentrate or matte burner 2 may comprise an annular gas feeding channel 15 that surrounds the solid matter feed pipe 12 and having an annular gas discharge opening 16 opening into the reaction shaft 8 of the suspension smelting furnace 1.

If the smelting furnace is in the form of a suspension smelting furnace as described earlier, the concentrate or matte burner 2 may comprise a concentrate distributor 17 extending out from the discharge opening 7 of the solid matter feed pipe 12 and into the reaction shaft 8 of the suspension smelting furnace 1.

If the smelting furnace is in the form of a suspension smelting furnace as described earlier, the feed material feeding arrangement 9 may, as is shown in the embodiments shown in FIGS. 2 to 8, comprise an closed air slide conveyor 18 in communication with the fine-grained matter feeding means 4 of the concentrate or matte burner 2 so that the closed air slide conveyor 18 is configured for feeding the fine-grained matter into the fine-grained matter feeding means 4 of the concentrate or matte burner 2. If the feed material feeding arrangement 9 comprises such closed air slide conveyor 18, the closed air slide conveyor 18 may be provided with at least one sensor 11 for measuring flow of fine-grained matter in the closed air slide conveyor 18. It is for example possible that in the embodiments shown in FIGS. 2 to 8, the air slide is provided with at least one sensor 11 for measuring flow of fine-grained matter in the closed air slide conveyor 18.

In these embodiments it is beneficial, but not necessary, that the arrangement comprises an additional fine-grained matter feeding arrangement 25 for feeding additional fine-grained matter into the fine-grained matter feeding means 4 downstream of the at least one sensor 11. Such embodiment is shown in FIG. 4. Such additional fine-grained matter may comprise at least one of the following: Silica, lime, limestone, reverts (i.e. ground mixture of recycled products and slag mixture), dust, electronic scrap, and solid coolant.

If the smelting furnace is in the form of a suspension smelting furnace as described earlier, the feed material feeding arrangement 9 may, as is shown in the first embodiment shown in FIG. 2, comprise an closed air slide conveyor 18 in communication with the bin 10 for fine-grained matter and in communication the fine-grained matter feeding means 4 of the concentrate or matte burner 2 so that the closed air slide conveyor 18 is configured for receiving fine-grained matter from the bin 10 for fine-grained matter and configured for feeding fine-grained matter into the fine-grained matter feeding means 4 of the concentrate or matte burner 2.

If the smelting furnace is in the form of a suspension smelting furnace as described earlier, the feed material feeding arrangement 9 may, as is shown in the second embodiment shown in FIG. 3, comprise conveyor 26 that is in communication with the bin 10 for fine-grained matter and that is in communication with a closed air slide conveyor 18 that in turn is in communication with the fine-grained matter feeding means 4 of the concentrate or matte burner 2 so that the conveyor 26 is configured for receiving fine-grained matter from the bin 10 for feed material, the closed air slide conveyor 18 is configured for receiving fine-grained matter from the conveyor 26 and the fine-grained matter feeding means 4 of the concentrate or matte burner 2 is configured for receiving feed material from the closed air slide conveyor 18.

In this second embodiment it is beneficial, but not necessary, that the arrangement comprises an additional fine-grained matter feeding arrangement 25 for feeding additional fine-grained matter into the fine-grained matter feeding means 4 downstream of the at least one sensor 11.

The second embodiment of the arrangement shown in FIG. 3 comprises preferably, but not necessarily, a loss-in-weight controller 20 between the conveyor 26 for fine-grained matter and the controlling means 19 for controlling feed of fine-grained matter from the bin 10 for fine grained-matter into the controlling means 19.

If the smelting furnace is in the form of a suspension smelting furnace as described earlier, the feed material feeding arrangement 9 may, as is shown in the third embodiment shown in FIG. 4, comprise a controlling means 19 that is in communication with a closed air slide conveyor 18. The closed air slide conveyor 18 is in communication with the fine-grained matter feeding means 4 of the concentrate or matte burner 2. In the third embodiment shown in FIG. 4 the controlling means 19 is configured for receiving fine-grained matter from the bin 10 for feed material, the closed air slide conveyor 18 is configured for receiving fine-grained matter from the controlling means 19, and the fine-grained matter feeding means 4 of the concentrate or matte burner 2 is configured for receiving feed material from the closed air slide conveyor 10.

In this third embodiment it is beneficial, but not necessary, that the arrangement comprises an additional fine-grained matter feeding arrangement 25 for feeding additional fine-grained matter into the fine-grained matter feeding means 4 downstream of the at least one sensor 11. Such additional fine-grained matter may comprise at least one of the following: Silica, lime, limestone, reverts (i.e. ground mixture of recycled products and slag mixture), dust, electronic scrap, and solid coolant.

If the smelting furnace is in the form of a suspension smelting furnace as described earlier, the feed material feeding arrangement 9 may, as is shown in the fourth embodiment shown in FIG. 5, comprise a dosing bin 21 that is in communication with the bin 10 for feed material and with a controlling means 19. The controlling means 19 is in communication with a closed air slide conveyor 18. The closed air slide conveyor 18 is in communication with the fine-grained matter feeding means 4 of the concentrate or matte burner 2. In the fourth embodiment shown in FIG. 5 the dosing bin 21 is configured for receiving fine-grained matter from the bin 10 for feed material, the controlling means 19 is configured for receiving fine-grained matter from the controlling means 19, the closed air slide conveyor 18 is configured for receiving fine-grained matter from the controlling means 19, and the fine-grained matter feeding means 4 of the concentrate or matte burner 2 is configured for receiving feed material from the closed air slide conveyor 18.

In this fourth embodiment it is beneficial, but not necessary, that the arrangement comprises an additional fine-grained matter feeding arrangement 25 for feeding additional fine-grained matter into the fine-grained matter feeding means 4 downstream of the at least one sensor 11.

The feed material feeding arrangement 9 may, as is shown in the fifth embodiment of the arrangement shown in FIG. 6, comprise a fluidization means 24 in communication with the bin 10 for fine-grained matter and in communication with a dosing bin 21. The dosing bin 21 is in communication with a controlling means 19 that is in communication with a closed air slide conveyor 18 that in turn is in communication with the fine-grained matter feeding means 4 of the concentrate or matte burner 2.

In this fourth embodiment it is beneficial, but not necessary, that the arrangement comprises an additional fine-grained matter feeding arrangement 25 for feeding additional fine-grained matter into the fine-grained matter feeding means 4 downstream of the at least one sensor 11. Such additional fine-grained matter may comprise at least one of the following: Silica, lime, limestone, reverts (i.e. ground mixture of recycled products and slag mixture), dust, electronic scrap, and solid coolant.

If the smelting furnace is in the form of a suspension smelting furnace as described earlier, the feed material feeding arrangement 9 may, as is shown in the fifth embodiment shown in FIG. 6, comprise a fluidization means 24 in communication with the bin 10 for fine-grained matter, a dosing bin 21 that is in communication with the fluidization means 24 and with a controlling means 19. The controlling means 19 is in communication with a closed air slide conveyor 18. The closed air slide conveyor 18 is in communication with the fine-grained matter feeding means 4 of the concentrate or matte burner 2. In the fifth embodiment shown in FIG. 6 the fluidization means 24 is configured for receiving fine-grained matter from the bin 10 for feed material, the dosing bin 21 is configured for receiving fine-grained matter from the fluidization means 24, the controlling means 19 is configured for receiving fine-grained matter from the controlling means 19, the closed air slide conveyor 18 is configured for receiving fine-grained matter from the controlling means 19, and the fine-grained matter feeding means 4 of the concentrate or matte burner 2 is configured for receiving feed material from the closed air slide conveyor 18.

In this fifth embodiment it is beneficial, but not necessary, that the arrangement comprises an additional fine-grained matter feeding arrangement 25 for feeding additional fine-grained matter into the fine-grained matter feeding means 4 downstream of the at least one sensor 11.

The fifth embodiment comprises preferably, but not necessarily, a valve means 22 between the bin 10 for fine grained-matter and the fluidization means 24. The fifth embodiment comprises preferably, but not necessarily, a valve means 22 between the fluidization means 24 and the dosing bin 21. The fifth embodiment comprises preferably, but not necessarily, a loss-in-weight controller 20 between the dosing bin 21 and the controlling means 19 for controlling feed of fine-grained matter from the dosing bin 21 into the controlling means 19. In this fifth embodiment, the arrangement comprises preferably, but not necessarily, an additional fine-grained matter feeding arrangement 25 for feeding additional fine-grained matter into the fine-grained matter feeding means 4 downstream of the at least one sensor 11. Such additional fine-grained matter may comprise at least one of the following: Silica, lime, limestone, reverts (i.e. ground mixture of recycled products and slag mixture), dust, electronic scrap, and solid coolant.

The feed material feeding arrangement 9 may, as is shown in the sixth embodiment of the arrangement shown in FIG. 7, comprise a dryer 23 in communication with the bin 10 for fine-grained matter and in communication with a dosing bin 21. The dosing bin 21 is in communication with a controlling means 19 that is in communication with a closed air slide conveyor 18 that in turn is in communication with the fine-grained matter feeding means 4 of the concentrate or matte burner 2.

If the smelting furnace is in the form of a suspension smelting furnace as described earlier, the feed material feeding arrangement 9 may, as is shown in the sixth embodiment shown in FIG. 7, comprise a dryer 23 in communication with the bin 10 for fine-grained matter, a dosing bin 21 that is in communication with the dryer 23 and with a controlling means 19. The controlling means 19 is in communication with a closed air slide conveyor 18. The closed air slide conveyor 18 is in communication with the fine-grained matter feeding means 4 of the concentrate or matte burner 2. In the sixth embodiment shown in FIG. 7 the dryer 23 is configured for receiving fine-grained matter from the bin 10 for feed material, the dosing bin 21 is configured for receiving fine-grained matter from the dryer 23, the controlling means 19 is configured for receiving fine-grained matter from the controlling means 19, the closed air slide conveyor 18 is configured for receiving fine-grained matter from the controlling means 19, and the fine-grained matter feeding means 4 of the concentrate or matte burner 2 is configured for receiving feed material from the closed air slide conveyor 18.

In this sixth embodiment it is beneficial, but not necessary, that the arrangement comprises an additional fine-grained matter feeding arrangement 25 for feeding additional fine-grained matter into the fine-grained matter feeding means 4 downstream of the at least one sensor 11.

The feed material feeding arrangement 9 may, as is shown in the seventh embodiment of the arrangement shown in FIG. 8, comprise a dryer 23 in communication with the bin 10 for fine-grained matter and in communication with a fluidization means 24. The fluidization means 24 is in communication with a dosing bin 21. The dosing bin 21 is in communication with a controlling mean 19. The controlling mean 19 is in communication with a closed air slide conveyor 18. The closed air slide conveyor 18 is in communication with the fine-grained matter feeding means 4 of the concentrate or matte burner 2.

If the smelting furnace is in the form of a suspension smelting furnace as described earlier, the feed material feeding arrangement 9 may, as is shown in the seventh embodiment shown in FIG. 8, comprise a dryer 23 in communication with the bin 10 for fine-grained matter, a fluidization means 24 in communication with the dryer 23 and with a dosing bin 21, and a controlling means 19 in communication with the dosing bin 21 and a closed air slide conveyor 18. The closed air slide conveyor 18 is in communication with the fine-grained matter feeding means 4 of the concentrate or matte burner 2. In the seventh embodiment shown in FIG. 8 the dryer 23 is configured for receiving fine-grained matter from the bin 10 for feed material, the fluidization means 24 is configured for receiving fine-grained matter from the dryer 23, the dosing bin 21 is configured for receiving fine-grained matter from the fluidization means 23, the controlling means 19 is configured for receiving fine-grained matter from the controlling means 19, the closed air slide conveyor 18 is configured for receiving fine-grained matter from the controlling means 19, and the fine-grained matter feeding means 4 of the concentrate or matte burner 2 is configured for receiving feed material from the closed air slide conveyor 18.

In this seventh embodiment it is beneficial, but not necessary, that the arrangement comprises an additional fine-grained matter feeding arrangement 25 for feeding additional fine-grained matter into the fine-grained matter feeding means 4 downstream of the at least one sensor 11. Such additional fine-grained matter may comprise at least one of the following: Silica, lime, limestone, reverts (i.e. ground mixture of recycled products and slag mixture), dust, electronic scrap, and solid coolant.

If the arrangement comprises a dryer 23 as is the case in the sixth embodiment shown in FIG. 7 and in the seventh embodiment shown in FIG. 8, the arrangement comprises preferably, but not necessarily, a sensor 11 for measuring flow of fine grained matter, which sensor 11 is functionally connected to the dryer 23 for controlling the dryer 23 based on the measured flow of fine grained-matter.

In the arrangement, the feed material may be in the form of granulated material the smelting furnace may be an electric furnace as shown in FIG. 15.

The arrangement comprises preferably, but not necessarily, a sensor 11 comprises at least one of the following: a tomography sensor such as an electrical capacitance tomography measuring sensor, an ultrasonic tomography measuring sensor, a radiometric sensor, and a microwave sensor.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. An arrangement for feeding fine-grained matter including concentrate or matte from a bin for fine-grained matter into a reaction shaft of a suspension smelting furnace
    wherein the suspension smelting furnace comprising a concentrate or matte burner having reaction gas feeding means and fine-grained matter feeding means,
    wherein the fine-grained matter feeding means of the concentrate or matte burner comprising a fine-grained matter feed pipe having a perimeter and having a discharge opening that opens into the reaction shaft of the suspension smelting furnace,
    wherein the arrangement comprises a feed material feeding arrangement for feeding fine-grained matter from the bin for fine-grained matter into the fine-grained matter feeding means of the concentrate or matte burner,
    wherein the fine-grained matter feed pipe of the concentrate or matte burner being divided into sectors,
    wherein the feed material is fine-grained matter including concentrate or matte,
    wherein the feed material feeding arrangement is configured for feeding fine-grained matter from the bin for feed material into the fine-grained matter feeding means of the concentrate or matte burner and comprises a closed air slide conveyor that is configured for feeding the fine-grained matter into the fine-grained matter feeding means of the concentrate or matte burner;
    wherein the closed air slide conveyor of the feed material feeding arrangement having a downstream end in communication with the fine-grained matter feeding means of the concentrate or matte burner,
    wherein the downstream end of the closed air slide conveyor of the feed material feeding arrangement is provided with partition that divides the downstream end of the closed air slide conveyor of the feed material feeding arrangement into several feed channels each feed channel ending into a sector of the fine-grained matter feed pipe of the fine-grained matter feeding means of the concentrate or matte burner, and
    wherein an electrical capacitance tomography measuring sensor that is provided at the closed air slide conveyor and configured to independently measure flow of fine-grained matter within each feed channel of the closed air slide conveyor of the feed material feeding arrangement.

2. The arrangement according to claim 1,
    wherein each sector of the fine-grained matter feed pipe of the concentrate or matte burner being provided with an adjustable damper that independently adjusts the flow of fine-grained matter within each sector of the fine-grained matter feed pipe.

3. The arrangement according to claim 1,
    wherein each feed channel of the closed air slide conveyor feed material feeding arrangement being provided with an adjustable damper that independently adjusts the flow of fine-grained matter within each feed channel of the feed material feeding arrangement.

* * * * *